(12) United States Patent
Finkelshtein et al.

(10) Patent No.: US 10,846,403 B2
(45) Date of Patent: Nov. 24, 2020

(54) DETECTING MALICIOUS EXECUTABLE FILES BY PERFORMING STATIC ANALYSIS ON EXECUTABLE FILES' OVERLAY

(71) Applicant: International Business Machines Corporation, Armonk, NY (US)

(72) Inventors: Andrey Finkelshtein, Beer Sheva (IL); Eitan Menahem, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 15/979,496

(22) Filed: May 15, 2018

(65) Prior Publication Data

US 2019/0354682 A1    Nov. 21, 2019

(51) Int. Cl.
  *G06F 21/56*    (2013.01)
  *G06N 20/00*    (2019.01)

(52) U.S. Cl.
  CPC ........... *G06F 21/565* (2013.01); *G06N 20/00* (2019.01); *G06F 2221/034* (2013.01)

(58) Field of Classification Search
  CPC .. G06F 21/565; G06F 2221/034; G06N 20/00
  See application file for complete search history.

(56) References Cited

U.S. PATENT DOCUMENTS 8,776,231 B2    7/2014  Moskovitch et al.
9,367,686 B1*   6/2016  Solodovnikov ....... G06F 21/561
9,384,364 B1*   7/2016  Ivanov ................. G06F 21/6218
2003/0065926 A1  4/2003  Schultz et al.
2008/0040710 A1*  2/2008  Chiriac ................ G06F 21/566
                                                          717/136

(Continued)

FOREIGN PATENT DOCUMENTS

WO    2017126786    7/2017

OTHER PUBLICATIONS

Kumar, Ajit et al., "A learning model to detect maliciousness of portable executable using integrated feature set", Journal of King Saud University—Computer and Information Sciences, Available online Jan. 31, 2017, pp. 252-265. (Year: 2017).*

(Continued)

*Primary Examiner* — Michael Pyzocha
(74) *Attorney, Agent, or Firm* — Gregory J. Kirsch (57) ABSTRACT

Embodiments of the present systems and methods may decide if a software file is malicious or benign, using properties of the file's overlay, if existing. For example, in an embodiment, a computer-implemented method for identifying malware in computer systems may comprise receiving a plurality of executable files labeled as being malicious or benign, training a machine learning model using properties extracted from overlays associated with each of the plurality of received labeled executable files, receiving an executable file that is not labeled, determining whether the received unlabeled executable file is malicious or benign using the trained machine learning model based on properties extracted from an overlay associated with the received unlabeled executable file, and transmitting information identifying the received unlabeled executable file as malicious when the received unlabeled executable file is determined to be malicious.

18 Claims, 5 Drawing Sheets

(56) References Cited

U.S. PATENT DOCUMENTS

| | | | |
|---|---|---|---|
| 2010/0146589 A1* | 6/2010 | Safa | G06F 21/52 |
| | | | 726/3 |
| 2011/0126286 A1* | 5/2011 | Nazarov | G06F 21/564 |
| | | | 726/24 |
| 2013/0139265 A1* | 5/2013 | Romanenko | G06F 21/56 |
| | | | 726/24 |
| 2014/0090061 A1 | 3/2014 | Avasarala et al. | |
| 2016/0335435 A1 | 11/2016 | Schmidtler et al. | |
| 2018/0032726 A1* | 2/2018 | Parinov | H04L 63/1408 |
| 2018/0351969 A1* | 12/2018 | MacLeod | G06F 11/2038 |

OTHER PUBLICATIONS

Hahn, Katja, "Robust Static Analysis of Portable Executable Malware, Master Thesis in Computer Science HTWK Leipzig Fakultat Informatik, Mathematik und Naturwissenschaften", Dec. 2014, 152 pages (Year: 2014).*

Hahn, Karsten, "Accurate Overlay Detection", blog posted May 19, 2014, 3 pages. (Year: 2014).*

Sheehan, Casey et al., "Pimp My PE: Parsing Malicious and Malformed Executables", Virus Bulletin 2007, 44 pages. (Year: 2007).*

A. V. Kozachok et al., "Heuristic Malware Detection Mechanism Based on Executable Files Static Analysis", 3rd International conference "Information Technology and Nanotechnology 2017", 2017, pp. 132-139.

Mamoun Alazab et al., "Zero-day Malware Detection based on Supervised Learning Algorithms of API call Signatures", Proceedings of the 9th Australasian Data Mining Conference (AusDM'11), 2011, pp. 171-181.

Carlos Andres Cepeda Mora, "Feature Selection and Improving Classification Performance for Malware Detection", A Thesis Presented to Department of Computer Science, Kennesaw State University, May 2017.

* cited by examiner

DETECTING MALICIOUS EXECUTABLE FILES BY PERFORMING STATIC ANALYSIS ON EXECUTABLE FILES' OVERLAY

BACKGROUND

The present invention relates to techniques for detecting malicious executable files by performing static analysis on executable files' overlay.

Malicious files (malwares) present a great risk to private users and organizations. The task of detecting malwares has been a major problem in recent years as the number of malware specimens grows and malware masquerading techniques are continuously improved.

Current malicious executables use various and multiple techniques to evade detection by anti-virus systems (AV). These techniques, for example, code packing, polymorphism, meta-morphism, encryption, etc., are typically performed "in-place", that is, on parts of the malicious file that load to memory when the file begins executing. Existing mechanisms to detect such malicious code perform with high efficiency and probability, thus making it harder for such attacks to succeed. Hence, malware has evolved to try to hide the malicious payload in sections of the file that are not loaded to memory when the file is executed, that is, where malicious payloads are not expected. After loading their "benign" content to memory, such malware will load their malicious content from other sources, therefore evading the existing defense mechanisms. One of the most popular techniques to perform this elusive technique is by appending the malicious payload as an overlay for the file.

An overlay of an executable file may be defined as an addition to the file that is not declared in its headers. Thus, there is no information about the existence or the content of the overlay in the file. The overlay is not loaded into memory when the file is executed. However, by simple programming, the "benign" running process may be made to read the malicious content of the overlay and load it into the computer's main memory at runtime. This code loading process is inherently different from conventional file execution, so that existing detection mechanisms of contemporary AVs may not detect such action as malicious. Moreover, adding an overlay to existing benign code is relatively easy, since the overlay can be appended to any executable file without breaking its electronic signing mechanism. The signing mechanism enables verification of the origin or name of the 'in-question' executable's creator.

Even though the overlay may be used by malware writers, the mere presence of an overlay by itself cannot "incriminate" a file. There are legitimate uses for overlays of executable files in benign software. For example, it can be useful when there is a need to add data to a program without adding extra files. Accordingly, existing techniques do not adequately address the issue of detecting malicious content that is present in an executable file's overlay.

A need arises for techniques for detecting malicious software that is present in an executable file's overlay.

SUMMARY

Embodiments of the present systems and methods may detect malicious executable file based on the executable file's overlay, which provides improvement over current technologies. In embodiments, a suspicious executable file may be analyzed by extracting the overlay of the file (if such exists), analyzing the overlay, and using the analysis to determine different properties about the overlay. These properties (possibly with other properties of the file) may be passed to a classifier that will decide if the file is malicious or benign.

For example, in an embodiment, a computer-implemented method for identifying malware in computer systems may comprise receiving a plurality of executable files labeled as being malicious or benign, training a machine learning model using properties extracted from overlays associated with each of the plurality of received labeled executable files, receiving an executable file that is not labeled, determining whether the received unlabeled executable file is malicious or benign using the trained machine learning model based on properties extracted from an overlay associated with the received unlabeled executable file, and transmitting information identifying the received unlabeled executable file as malicious when the received unlabeled executable file is determined to be malicious.

In embodiments, the extracted properties may include at least one property selected from a group comprising basic overlay properties including at least one of existence of the overlay, a size of the overlay, ratio between the size of the overlay and a size of the executable file, statistical content properties of blocks of data of the executable file's overlay, deep content properties that characterize a content of the overlay including at least one of a reputation of URLs, domains and IP addresses found in the overlay, signatures or fingerprints found in binary code of the overlay, and text analysis of readable content of the overlay, and other properties based on file analysis techniques that have been modified or adapted to overlay analysis including an N-Gram of the overlay. The machine learning model may include at least one model selected from a group comprising supervised learning models, including a classifier model, a neural network model, a Bayesian model, a decision tree model, a support vector machine model, and unsupervised learning models including a clustering model and a neural network model. The properties may be extracted from the overlays by static analysis wherein the executable files and overlays are inspected when they are not being executed. The received executable files may be received from a source including at least one of a web browser, an email message, and a file system. The overlay may be a portable-executable file and the determining is performed by analyzing the overlay separately from any analysis of other sections of the received executable file.

In an embodiment, a system for identifying malware in computer systems may comprise a processor, memory accessible by the processor, and computer program instructions stored in the memory and executable by the processor to perform: receiving a plurality of executable files labeled as being malicious or benign, training a machine learning model using properties extracted from overlays associated with each of the plurality of received labeled executable files, receiving an executable file that is not labeled, determining whether the received unlabeled executable file is malicious or benign using the trained machine learning model based on properties extracted from an overlay associated with the received unlabeled executable file, and transmitting information identifying the received unlabeled executable file as malicious when the received unlabeled executable file is determined to be malicious.

In an embodiment, a computer program product for identifying malware in computer systems may comprise a non-transitory computer readable storage having program instructions embodied therewith, the program instructions executable by a computer, to cause the computer to perform a method comprising: receiving a plurality of executable files labeled as being malicious or benign, training a machine learning model using properties extracted from overlays associated with each of the plurality of received labeled executable files, receiving an executable file that is not labeled, determining whether the received unlabeled executable file is malicious or benign using the trained machine learning model based on properties extracted from an overlay associated with the received unlabeled executable file, and transmitting information identifying the received unlabeled executable file as malicious when the received unlabeled executable file is determined to be malicious.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may detect malicious content that is present in an executable file's overlay, which provides improvement over current technologies. In embodiments, a suspicious executable file may be analyzed by extracting the overlay of the file (if such exists), analyzing the overlay, and using the analysis to determine different properties about the overlay. These properties (possibly with other properties of the file) may be passed to a classifier that will decide if the file is malicious or benign.

Embodiments of the present systems and methods may use automatic static analysis that is based on supervised machine learning. A malware detection mechanism may analyze the overlay of Portable Executable (PE) files, separately from the other sections of the executable. A set of properties of the portable-executable overlay (namely, features) may be extracted, machine learning algorithm may be trained upon these extracted features, benign and malicious software may be discriminated.

Figure 1:
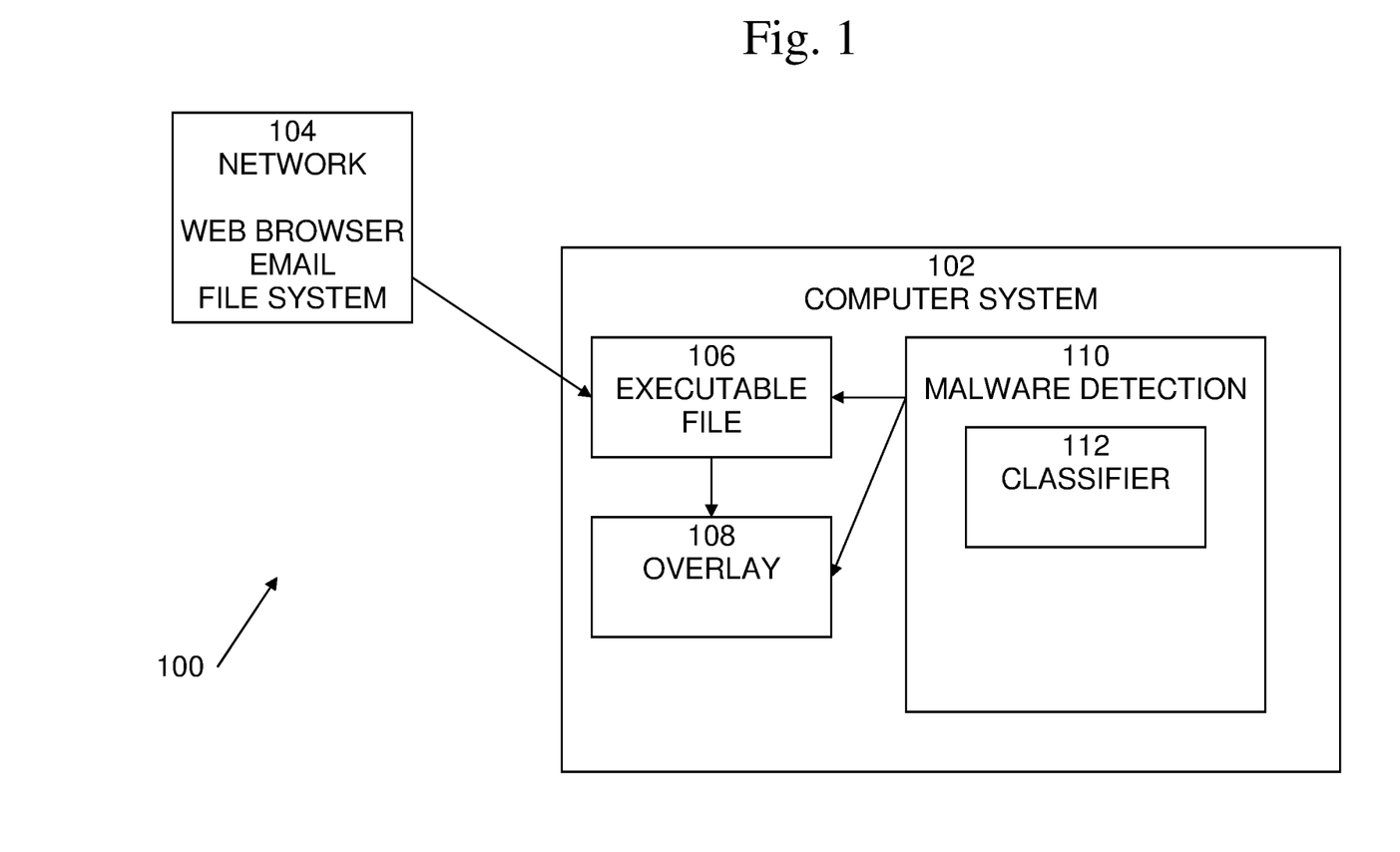
FIG. 1 illustrates an exemplary block diagram of a system in which techniques of the present systems and methods may be implemented.

An exemplary block diagram of a system 100, in which techniques of the present systems and method may be implemented is shown in FIG. 1. In this example, system 100 includes computer system 102 and network 104. Typically, computer system 102 may be implemented using one or more programmed general-purpose computer systems, such as personal computers, smartphones, tablets or tablet computers, workstations, server systems, minicomputers or mainframe computers, etc. Network 104 is typically the Internet, but may be any standard or proprietary, or public or private network. Typically, computer system 102 is a system that is connected to the Internet and operated by a user, but any type of computer system connected to any type of network may be used. Typically, computer system 102 may receive an executable file 106 from network 104, for example, via a web browser, an email service, a file system, etc. Such an executable file may include or be associated with an overlay 108. For example, executable file 106, when received, may include an overlay 108 portion that is not otherwise referenced in headers or other metadata of the file. Likewise, executable file 106, when received, may not include an overlay 108 portion, but may obtain overlay 108 from network 104, or other storage, and may cause overlay 108 to be loaded to memory. Executable file 106 and overlay 108 may be analyzed by malware detection system 110, to determine a likelihood that the executable file 106 and/or overlay 108 are malware.

In embodiments, the present malware detection techniques may include two working phases: a training phase and an operational or on-line phase. The training phase may include training of a classification model on a corpus of labeled malicious and benign files to generate a trained classifier model 112. The training phase may be performed before the operational phase. In the operational phase, samples of suspicious portable executable files may arrive at the computer system 102, and trained classifier model 112 may be used for classifying the samples as benign or malicious.

Figure 2:
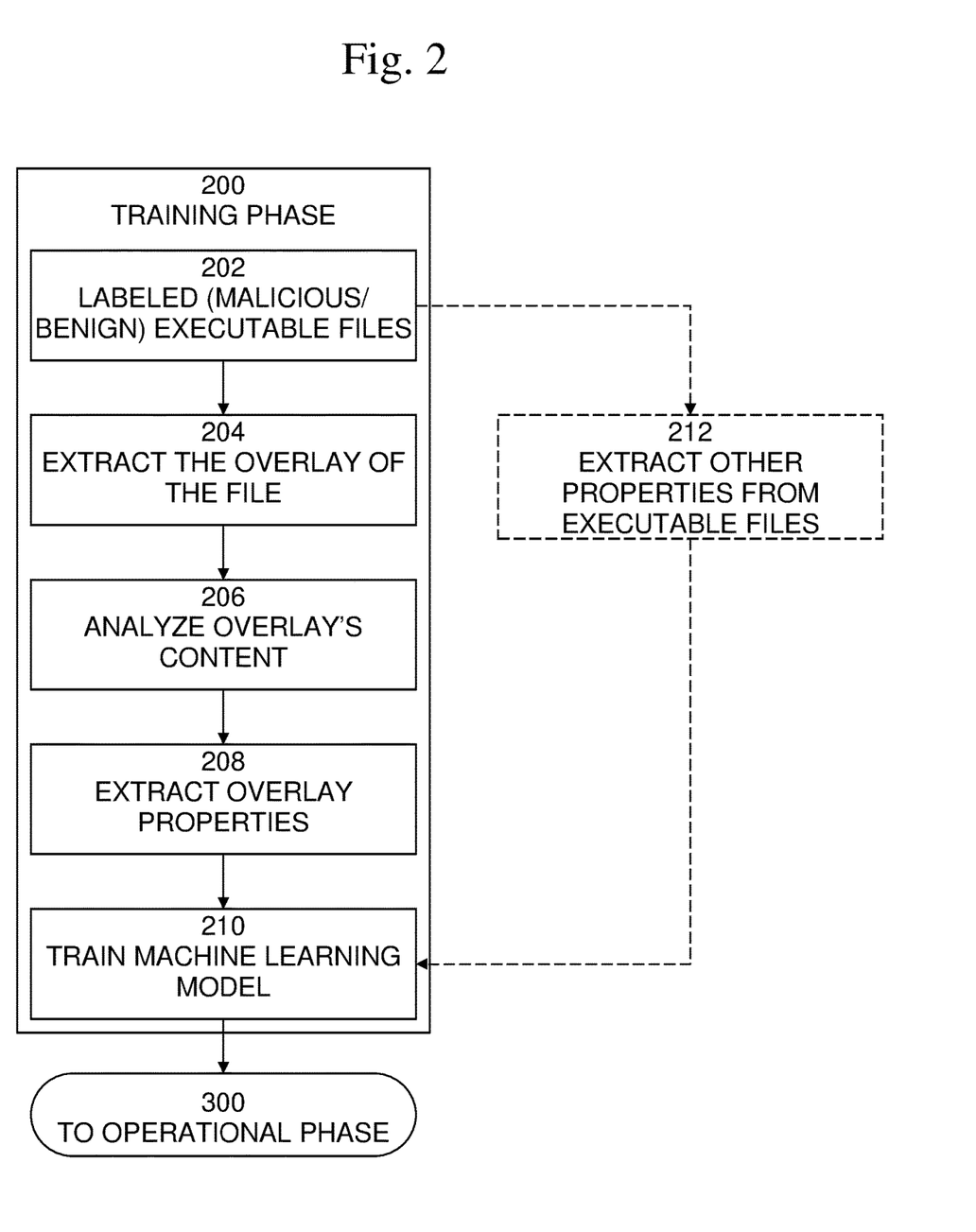
FIG. 2 is an exemplary flow diagram of an embodiment of a training phase process.

An exemplary flow diagram of an embodiment of a training phase process 200 involved in the present techniques is shown in FIG. 2. Training phase process 200 may begin with 202, in which executable files, which have been labeled as malicious or benign, may be received by training phase process 200. At 204, the received executable files may be analyzed and any overlay portion may be extracted or retrieved. At 206, the extracted or retrieved overlays may be analyzed to determine the properties that may be present. In embodiments, static analysis may be performed, that is, the executable files and associated overlays are inspected when they are not being executed. At 208, the relevant determined properties may be extracted from the overlays. At 210, a machine learning model may be trained to recognize malicious examples using the extracted properties and the labels, and to distinguish such malicious examples from benign examples. Typically, the machine learning model may be a classifier model, but any machine learning model may be used. For example, other supervised learning models, such as some types of neural network models, Bayesian models, decision tree models, support vector machines, etc., may be used. Likewise, although labeled data may be present, or alternatively, if unlabeled data is present, unsupervised learning models may be used, such as clustering models, some types of neural networks, etc. In embodiments, at 212, other or additional properties may be extracted and used for training 210 the machine learning model.

Figure 3:
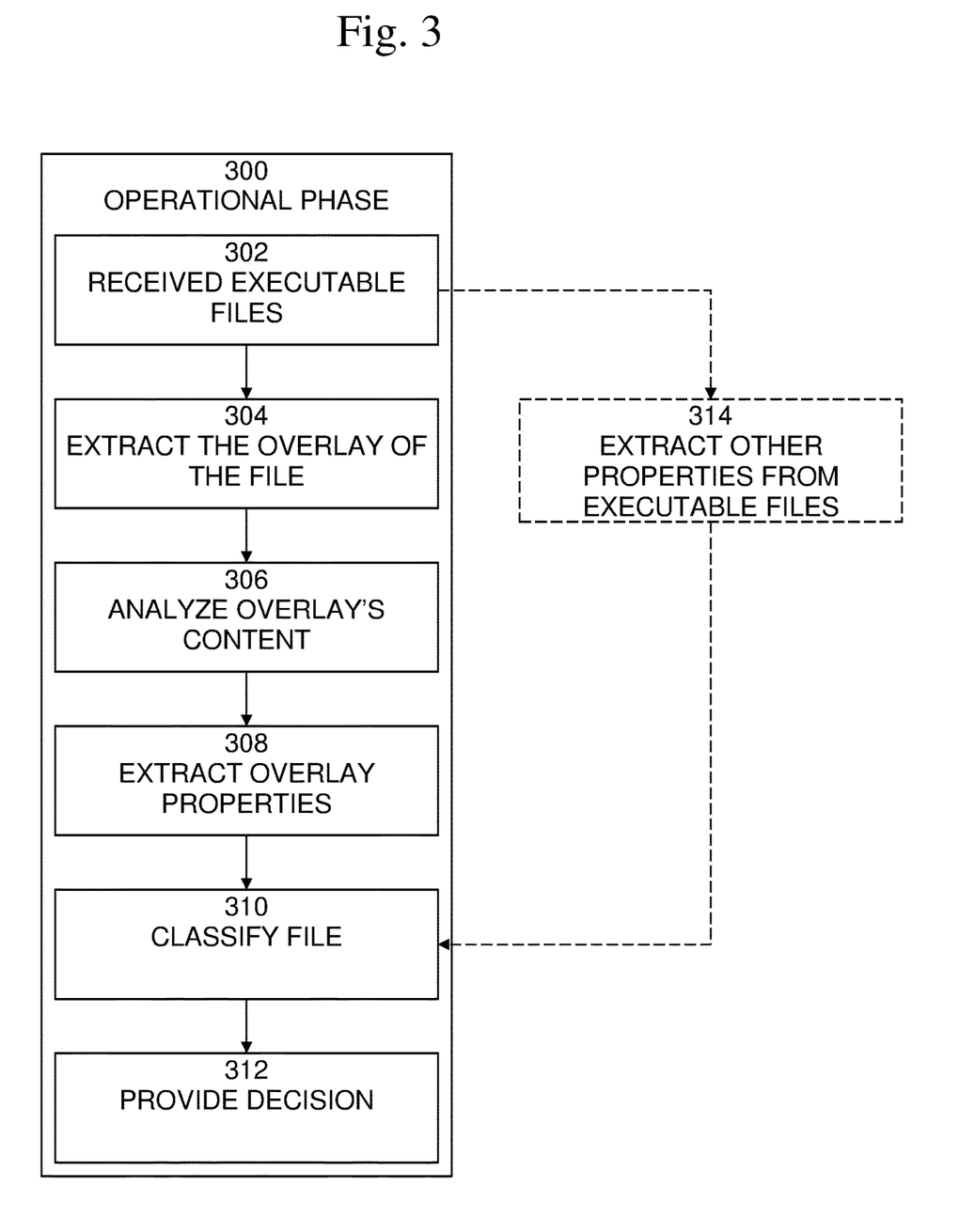
FIG. 3 is an exemplary flow diagram of an embodiment of an operational phase process.

An exemplary flow diagram of an operational phase process 300 involved in the present techniques is shown in FIG. 3. Training phase process 300 may begin with 302, in which executable files, which are to be determined as being as malicious or benign, may be received by operational phase process 300. At 304, the received executable files may be analyzed and any overlay portion may be extracted or retrieved. At 306, the extracted or retrieved overlays may be analyzed to determine the properties that may be present. In embodiments, static analysis may be performed, that is, the executable files and associated overlays are inspected when they are not being executed. At 308, the relevant determined properties may be extracted from the overlays. At 310, a machine learning model may be used to classify the extracted properties and labels to decide whether each received executable file is either malicious or benign, and may determine an associated confidence level for the determination. Typically, the machine learning model may be a classifier model, but any machine learning model may be used. For example, other supervised learning models, such as some types of neural network models, Bayesian models, decision tree models, support vector machines, etc., may be used. At 312, the determined decision, and any associated confidence level, may be provided. In embodiments, at 314, other or additional properties may be extracted and used for classification 310 by the machine learning model.

Figure 4:
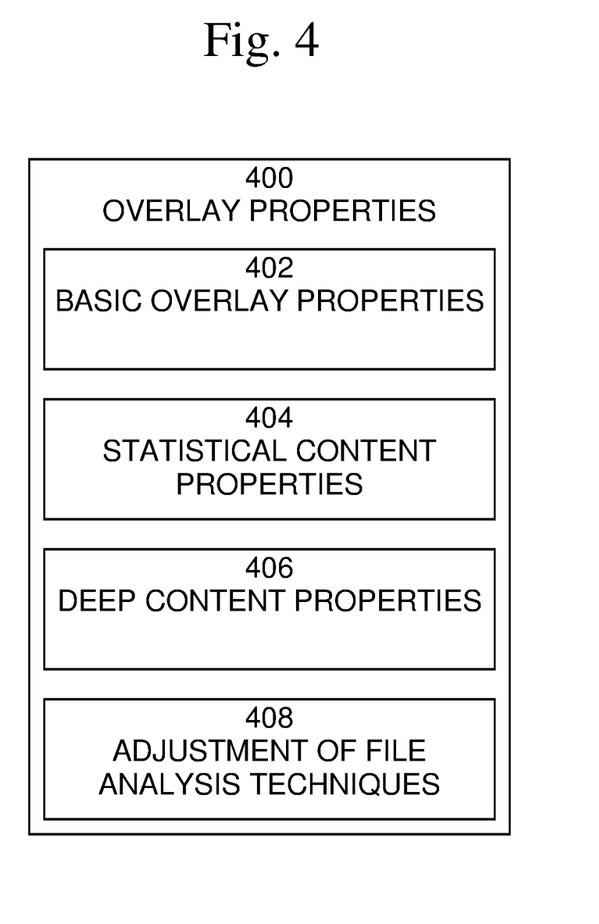
FIG. 4 is an exemplary diagram of categories of properties that may be extracted by the processes shown in FIGS. 2 and 3.

Examples of categories of properties 400 that may be extracted are shown in FIG. 4. In this example, overlay property categories shown may include basic overlay properties 402, statistical content properties 404, deep content properties 406, and properties relating to adjustment of file analysis techniques. Basic overlay properties 404 may include simple properties about the overlay, such as the existence of the overlay (a Boolean or true/false value), the size of the overlay, the ratio between the overlay's size and the size of the entire file, etc. Statistical content properties 404 may include treating the overlay as blocks of data (for example, bytes, kilobytes, etc.) and applying statistical measures on these blocks. For example, the byte distribution of the overlay and the Shannon's entropy of the overlay may be used for byte blocks.

Deep content properties 406 may characterize the content of the overlay. More specifically, these properties may reflect the type of content that the overlay encapsulates and information about this content type. Typically, deep content properties may be characterizations of the content of the overlay that are generated based on particular data found in the overlay. For example, the reputation of URLs, domains and IP addresses found in the overlay, signatures/fingerprints found in binary code, and text analysis of readable content may be generated. In addition, other techniques for extracting properties for malware detection such as byte n-grams analysis may be applied to the overlay. Adjustment of file analysis techniques 408 may include properties that are based on file analysis techniques that have been modified or adapted to overlay analysis. For example, the term-frequency of "benign" and "malicious" N-Grams in the file may be adjusted to overlay analysis by: 1) creating a new repository of "benign" and "malicious" N-Grams for the overlay content; and 2) calculating the properties of term-frequency only for the overlay itself and not for the entire file. For example, an n-gram may be a contiguous sequence of n binary items from a given sample of text, such as bytes, op-codes, assembly instructions, system-call, etc. Any other such techniques may be modified or adapted to overlay analysis. Examples may include cross/relative entropy properties, image processing properties, etc.

Figure 5:
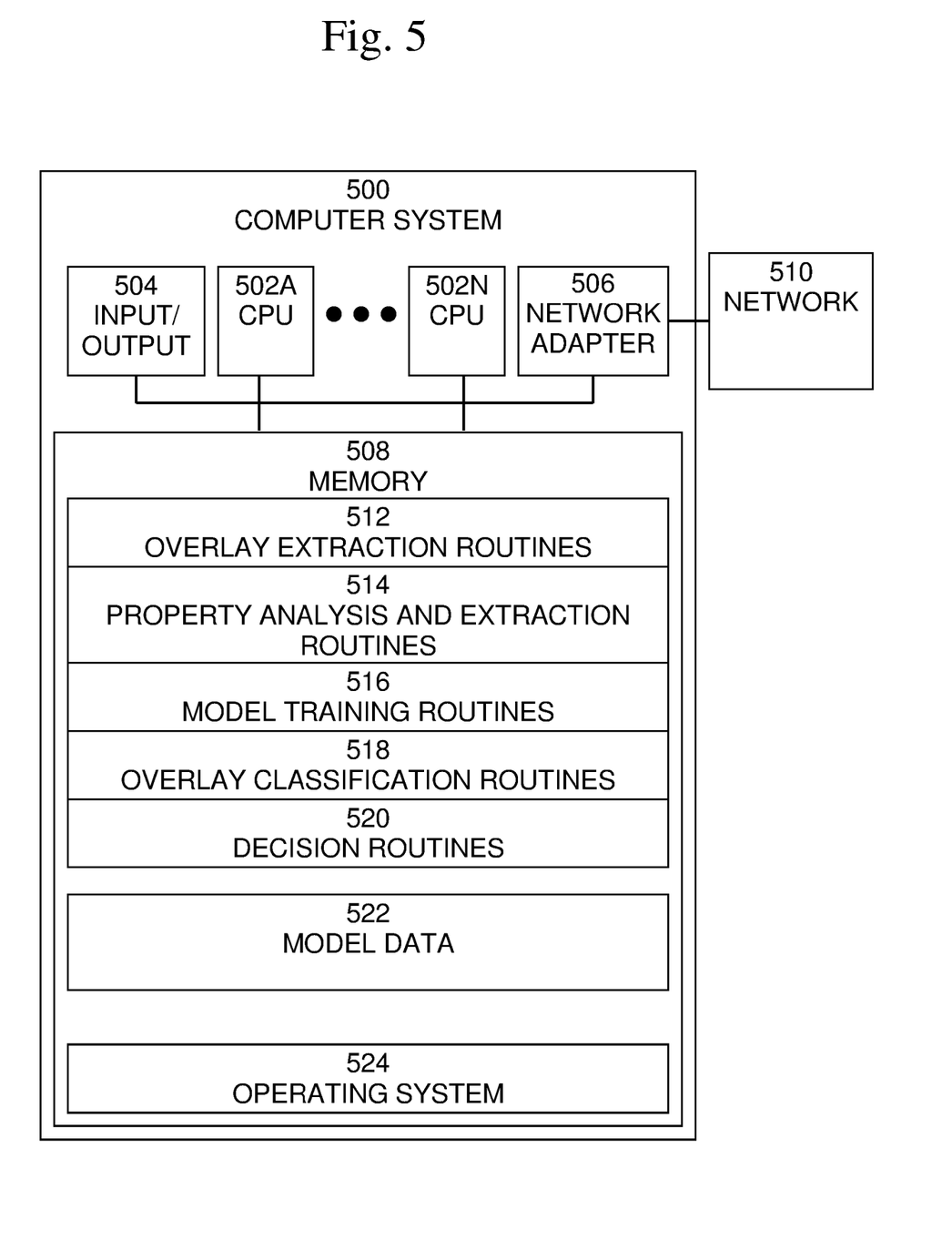
FIG. 5 is an exemplary block diagram of a computer system in which processes involved in the embodiments described herein may be implemented.

An exemplary block diagram of a computer system 502, in which processes involved in the embodiments described herein may be implemented, is shown in FIG. 5. Computer system 502 may be implemented using one or more programmed general-purpose computer systems, such as embedded processors, systems on a chip, personal computers, workstations, server systems, and minicomputers or mainframe computers, or in distributed, networked computing environments. Computer system 502 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor. FIG. 5 illustrates an embodiment in which computer system 502 is implemented as a single multi-processor computer system, in which multiple processors 502A-502N share system resources, such as memory 508, input/output circuitry 504, and network adapter 506. However, the present communications systems and methods also include embodiments in which computer system 502 is implemented as a plurality of networked computer systems, which may be single-processor computer systems, multi-processor computer systems, or a mix thereof.

Input/output circuitry 504 provides the capability to input data to, or output data from, computer system 502. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 502. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 502 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 5, memory 508 may include overlay extraction routines 512, property analysis and extraction routines 514, model training routines 516, overlay classification routines 518, decision routines 520, model data 522, and operating system 524. Overlay extraction routines 512 may include software routines to analyze received executable files and to extract or retrieve and any associated overlay portion. Property analysis and extraction routines 514 may include software routines to analyze the extracted or retrieved overlays to determine the properties that may be present, and to extract the relevant determined properties from the overlays. Model training routines 516 may include software routines to train a machine learning model to recognize malicious examples using the extracted properties and the labels from labeled executable files, and to distinguish such malicious examples from benign examples. Overlay classification routines 518 may include software routines to classify the extracted properties from unlabeled executable files to decide whether each received unlabeled executable file is either malicious or benign, and may determine an associated confidence level for the determination. Decision routines 520 may include software routines to provide or transmit the determined decision, and may provide or transmit any associated confidence level. Model data 522 may include data defining the structure of the machine learning model, as well as data implementing the trained machine learning model. Operating system 520 may provide overall system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for identifying malware in computer systems comprising:
   receiving a plurality of executable files labeled as being malicious or benign, wherein at least some of the plurality of executable files do not include an overlay portion, but obtains an overlay from a network or storage;
   training a machine learning model using properties extracted from overlays associated with each of the plurality of received labeled executable files;
   receiving an executable file that is not labeled, the executable file including an overlay portion that is not referenced in headers or other meta data of the executable file;
   determining whether the received unlabeled executable file is malicious or benign using the trained machine learning model based on properties extracted from an overlay associated with the received unlabeled executable file; and
   transmitting information identifying the received unlabeled executable file as malicious when the received unlabeled executable file is determined to be malicious.

2. The method of claim 1, wherein the extracted properties include at least one property selected from a group comprising basic overlay properties including at least one of existence of the overlay, a size of the overlay, and a ratio between the size of the overlay and a size of the executable file, statistical content properties of blocks of data of the executable file, the overlay, or both, deep content properties that characterize a content of the overlay including at least one of a reputation of URLs, domains and IP addresses found in the overlay, signatures or fingerprints found in binary code of the overlay, and text analysis of readable content of the overlay, and other properties based on file analysis techniques that have been modified or adapted to overlay analysis including an N-Gram of the overlay.

3. The method of claim 1, wherein the machine learning model includes at least one model selected from a group comprising supervised learning models, including a classifier model, a neural network model, a Bayesian model, a decision tree model, a support vector machine model, and unsupervised learning models including a clustering model and a neural network model.

4. The method of claim 1, wherein the properties are extracted from the overlays by static analysis wherein the executable files and overlays are inspected when they are not being executed.

5. The method of claim 1, wherein the received executable files are received from a source including at least one of a web browser, an email message, and a file system.

6. The method of claim 1, wherein the overlay is a portable-executable file and the determining is performed by analyzing the overlay separately from any analysis of other sections of the received executable file.

7. A system for identifying malware in computer systems, the system comprising a processor, memory accessible by the processor, and computer program instructions stored in the memory and executable by the processor to perform:
   receiving a plurality of executable files labeled as being malicious or benign, wherein at least some of the plurality of executable files do not include an overlay portion, but obtains an overlay from a network or storage;
   training a machine learning model using properties extracted from overlays associated with each of the plurality of received labeled executable files;
   receiving an executable file that is not labeled, the executable file including an overlay portion that is not referenced in headers or other meta data of the executable file;
   determining whether the received unlabeled executable file is malicious or benign using the trained machine learning model based on properties extracted from an overlay associated with the received unlabeled executable file; and
   transmitting information identifying the received unlabeled executable file as malicious when the received unlabeled executable file is determined to be malicious.

8. The system of claim 7, wherein the extracted properties include at least one property selected from a group comprising basic overlay properties including at least one of existence of the overlay, a size of the overlay, and a ratio between the size of the overlay and a size of the executable file, statistical content properties of blocks of data of the executable file, the overlay, or both, deep content properties that characterize a content of the overlay including at least one of a reputation of URLs, domains and IP addresses found in the overlay, signatures or fingerprints found in binary code of the overlay, and text analysis of readable content of the overlay, and other properties based on file analysis techniques that have been modified or adapted to overlay analysis including an N-Gram of the overlay.

9. The system of claim 7, wherein the machine learning model includes at least one model selected from a group comprising supervised learning models, including a classifier model, a neural network model, a Bayesian model, a decision tree model, a support vector machine model, and unsupervised learning models including a clustering model and a neural network model.

10. The system of claim 7, wherein the properties are extracted from the overlays by static analysis wherein the executable files and overlays are inspected when they are not being executed.

11. The system of claim 7, wherein the received executable files are received from a source including at least one of a web browser, an email message, and a file system.

12. The system of claim 7, wherein the overlay is a portable-executable file and the determining is performed by analyzing the overlay separately from any analysis of other sections of the received executable file.

13. A computer program product for identifying malware in computer systems, the computer program product comprising a non-transitory computer readable storage having program instructions embodied therewith, the program instructions executable by a computer, to cause the computer to perform a method comprising:
receiving a plurality of executable files labeled as being malicious or benign, wherein at least some of the plurality of executable files do not include an overlay portion, but obtains an overlay from a network or storage;
training a machine learning model using properties extracted from overlays associated with each of the plurality of received labeled executable files;
receiving an executable file that is not labeled, the executable file including an overlay portion that is not referenced in headers or other meta data of the executable file;
determining whether the received unlabeled executable file is malicious or benign using the trained machine learning model based on properties extracted from an overlay associated with the received unlabeled executable file; and
transmitting information identifying the received unlabeled executable file as malicious when the received unlabeled executable file is determined to be malicious.

14. The computer program product of claim 13, wherein the extracted properties include at least one property selected from a group comprising basic overlay properties including at least one of existence of the overlay, a size of the overlay, and a ratio between the size of the overlay and a size of the executable file, statistical content properties of blocks of data of the executable file, the overlay, or both, deep content properties that characterize a content of the overlay including at least one of a reputation of URLs, domains and IP addresses found in the overlay, signatures or fingerprints found in binary code of the overlay, and text analysis of readable content of the overlay, and other properties based on file analysis techniques that have been modified or adapted to overlay analysis including an N-Gram of the overlay.

15. The computer program product of claim 13, wherein the machine learning model includes at least one model selected from a group comprising supervised learning models, including a classifier model, a neural network model, a Bayesian model, a decision tree model, a support vector machine model, and unsupervised learning models including a clustering model and a neural network model.

16. The computer program product of claim 13, wherein the properties are extracted from the overlays by static analysis wherein the executable files and overlays are inspected when they are not being executed.

17. The computer program product of claim 13, wherein the received executable files are received from a source including at least one of a web browser, an email message, and a file system.

18. The computer program product of claim 13, wherein the overlay is a portable-executable file and the determining is performed by analyzing the overlay separately from any analysis of other sections of the received executable file.

* * * * *